United States Patent Office 3,438,907
Patented Apr. 15, 1969

3,438,907
IODINE-CONTAINING NONIONIC
SURFACTANT COMPOSITIONS
Irving R. Schmolka, Grosse Ile, Mich., assignor to Wyandotte Chemicals Corporation, Wyandotte, Mich., a corporation of Michigan
No Drawing. Filed July 26, 1965, Ser. No. 474,986
Int. Cl. C11d 3/48; C07c 43/02
U.S. Cl. 252—106                          14 Claims

ABSTRACT OF THE DISCLOSURE

Iodine-containing compositions are obtained by mixing elemental iodine with liquid, biodegradable, nonionic, heteric surfactants having enhanced detergency. The heteric surfactants are prepared by condensing, in at least two distinct steps, certain mixtures of ethylene oxide and propylene oxide with an organic compound having an active hydrogen atom and from 8 to 22 carbon atoms so that the total weight of the surfactants is from 67% to 80% oxyethylene and oxypropylene groups, the weight ratio of oxyethylene to oxypropylene being from 1.3:1 to 6.8:1. The compositions may be then diluted with water, acidified, and thereafter used in the cleaning and sanitizing of food-handling equipment.

This invention relates to liquid, detergent, germicidal and sanitizing iodine-containing compositions which, upon acidification and dilution with water, are particularly adapted for use in the cleaning and sanitizing of food-handling equipment. More particularly, this invention relates to iodine-containing compositions in which the iodine is complexed with a liquid, biodegradable, water-miscible, nonionic surfactant.

Iodine-containing, detergent, germicidal and sanitizing compositions are well known in the art, as are the various needs for, and advantages associated with, these compositions. Generally, these compositions are prepared by complexing iodine with a surfactant. Various surfactants have been employed in this application, including the Pluronic polyols, a trademark of Wyandotte Chemicals Corporation which designates the compounds disclosed and claimed in U.S. Patent No. 2,674,619, compounds sold under the name Antarox, a trade name of General Aniline & Film Corporation which designates a series of alkyl aryl polyether glycols, compounds sold under the name Nacconol, a trade name of Allied Chemical Corporation which designates a group of alkyl aryl sulfonates, and those compounds disclosed in U.S. Patents Nos. 1,970,578 and 2,213,477. Although the surfactants listed above are effective iodine carriers, they lack at least one property presently essential to their continued use in this application, that is, biodegradability. It is now established that if surfactants are to be used in commercial formulations they must be biodegradable. In addition to being biodegradable, the surfactants must also be water-miscible, they should possess enhanced detergency and they should, preferably, be liquids in order to facilitate preparation and handling of the resulting compositions.

Now, in accordance with this invention, new detergent, germicidal and sanitizing iodine-containing compositions are obtained by mixing elemental iodine with a liquid, biodegradable, water-miscible, nonionic surfactant prepared by the condensation of mixtures of ethylene oxide and propylene oxide with an organic compound containing an active hydrogen atom and from 8 to 22 carbon atoms in straight chain relationship. The nonionic surfactants which are employed in this invention may be represented by the following formula:

R°—A—X—(R′—R″—H)$_a$

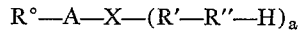

wherein R° is H or X(R′R″H)$_a$, A is a straight chain hydrocarbyl radical having from 8 to 22 carbon atoms, X is O, S,

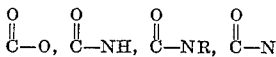

NH,NR,N,PO$_4$,SO$_3$NH,SO$_3$NR,SO$_3$N,SNH,SNR,or SN,
$a$ is 1 when X is O, S,

NH,NR,PO$_4$,SO$_3$NH,SO$_3$NR,
SNH, or SNR and 2 when X is

N, SO$_3$N, or SN, R is an alkyl group having from 1 to 4 carbon atoms, R′ is selected from the group consisting of oxypropylene groups and a mixture of oxyethylene and oxypropylene groups, the weight ratio of oxyethylene to oxypropylene in said mixture being a number less than 1, R″ is a mixture of oxyethylene and oxypropylene groups, the weight ratio of oxyethylene to oxypropylene being such that the total weight ratio of oxyethylene to oxypropylene in R′ and R″ is from 1.3:1 to 6.8:1, the total weight of the surfactant being from 67% to 80% oxyethylene and oxypropylene groups. It is to be understood that if a mixture of organic compounds is employed in the condensation reaction, the product obtained will be a mixture of compounds having the foregoing formula.

The nonionic surfactants which are preferably employed in this invention are those prepared from a straight chain aliphatic alcohol, ethylene oxide and propylene oxide. They may be represented by the following formula:

R°—A—O—R′—R″—H

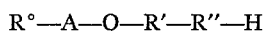

wherein R° is H, A is a straight chain alkylene group having from 8 to 22 carbon atoms, and R′ and R″ are the same as defined above. If a mixture of alcohols is employed, then the surfactant will be a mixture of compounds having the foregoing formula. The R°—A—O in the foregoing formula may also be defined as the residue of the alcohol employed in the condensation reaction, that is, the alcohol with the active hydrogen removed.

Organic compounds which may be employed in the preparation of the nonionic surfactants used in accordance with this invention are those compounds which contain an active hydrogen atom and from 8 to 22 carbon atoms in straight chain relationship. Alcohols, mercaptans, carboxylic acids, substituted carboxylic acids, amides, substituted amides, amines, substituted amines, orthophosphates, sulfonamides, substituted sulfonamides, thioamides, substituted thioamides, and mixtures thereof are illustrative of those compounds which are operable. As mentioned above, alcohols are the preferred compounds and mixtures of alcohols are more preferred since their use provides for a good balance of properties in the resulting surfactants. Branched chain organic compounds are not operable nor are organic compounds containing less than eight carbon atoms since these compounds do not impart biodegradability to the resulting products, nor do the products resulting from their use, along with the stated amounts of oxides, possess good detergency. However, it is possible to employ small amounts of branched chain organic compounds along with the straight chain organic compounds employed in this invention as long as the biodegradability of the resulting product is not impaired. Examples of alcohols which are operable include n-octyl alcohol, n-nonyl alcohol, n-decyl alcohol, n-dodecyl alcohol, n-tridecyl alcohol, n-tetradecyl alcohol, cetyl alcohol, lauryl alcohol, stearyl alcohol, and mixtures thereof.

Examples of mercaptans which are operable include n-dodecyl thiol, 2-dodecyl thiol, n-tetradecyl thiol, n-hexadecyl thiol, n-octadecyl thiol, n-decyl thiol, and mixtures thereof.

Examples of carboxylic acids which are operable include both the mono- and dicarboxylic acids such as 1,12-dodecane dicarboxylic acid, 1,10-decane dicarboxylic acid, n-octanoic acid, n-decanoic acid, n-dodecanoic acid, n-tetradecanoic acid, n-hexadecanoic acid, ricinoleic acid, oleic acid, linoleic acid and linolenic acid, and mixtures thereof.

Examples of amides which are operable include n-octyl amide, n-decyl amide, n-dodecyl acide, n-tetradecyl amide, n-hexadecyl amide, n-octadecyl amide, n-oleic amide, n-linoleic amide, n-linolenic amide, ricinoleic amide, N-methyl-n-dodecyl amide, N-ethyl-n-tetradecyl amide, N-butyl-n-octadecyl amide, $\alpha,\omega$-dodecandioic monoamide, $\alpha,\omega$-dodecandioic diamide, and mixtures thereof.

Examples of amines which are operable include n-octyl amine, n-decyl amine, n-dodecyl amine, n-tetradecyl amine, n-hexadecyl amine, n-octadecyl amine, n-tridecyl amine, secdodecyl amine, N-methyl-n-dodecyl amine, N-ethyl-n-tetradecyl amine, and mixtures thereof.

Examples of phosphates which are operable include monostearyl orthophosphate, monolauryl orthophosphate, monodecyl orthophosphate, monooleyl orthophosphate, and mixtures thereof.

Examples of sulfonamides which are operable include n-octyl sulfonamide, n-decyl sulfonamide, n-dodecyl sulfonamide, N-methyl-n-decyl sulfonamide, N-propyl-n-octyl sulfonamide, and mixtures thereof.

Examples of thioamides which are operable include n-octyl thioamide, n-decyl thioamide, N-ethyl-n-octyl thioamide, N-methyl-n-tridecyl thioamide, and mixtures thereof.

The surfactants employed in this invention are prepared by condensing an organic compound, or mixture of organic compounds as described above, with mixtures of ethylene oxide and propylene oxide. The oxide mixtures are added to the organic compound in steps; generally, in at least two distinct steps. In the first step, a mixture containing more propylene oxide than ethylene oxide, or propylene oxide alone, is condensed with an organic compound as described above. Thereafter, in the second step, the condensed product from the first step is further condensed with a mixture of ethylene oxide and propylene oxide, the weight ratio of ethylene oxide to propylene oxide being such that the total weight ratio of ethylene oxide to propylene oxide is from 1.3:1 to 6.8:1.

It is possible to prepare the nonionic surfactants employed in this invention by adding mixtures of oxides to an organic compound in more than two distinct steps. If surfactants are so prepared, it is necessary that the initial mixture comprise either all propylene oxide or more propylene oxide than ethylene oxide, the final mixture comprise more ethylene oxide than propylene oxide, and all intermediate mixtures comprise various amounts of ethylene oxide and propylene oxide such that the total amount of oxides employed be such that the products contain from 67% to 80% by weight of oxyethylene and oxypropylene groups and that the weight ratio of oxyethylene to oxypropylene groups in said products be in the range of from 1.3:1 to 6.8:1.

The products prepared as described above have a heteric structure. By this is meant the products possess random distribution of oxyethylene and oxypropylene groups. As mentioned above, the amount of oxides used is very important. In order to obtain the products utilizable in this invention, it is important the oxides be employed in a weight ratio of ethylene oxide to propylene oxide of from 1.3:1 to 6.8:1, preferably 1.3:1 to 3:1. Not only is it important the ratio of ethylene oxide to propylene oxide be maintained within the above-stated range, but also it is important that the total amount of oxides employed be such that the products contain from 67% to 80% by weight of oxyethylene and oxypropylene groups.

The nonionic surfactants employed in this invention are generally prepared by condensing an organic compound with a mixture of ethylene oxide and propylene oxide in the presence of an alkaline catalyst. Catalysts which may be employed include sodium hydroxide, potassium hydroxide, sodium ethylate, sodium methylate, potassium acetate, sodium acetate, trimethylamine and triethylamine. Any other types of catalyst commonly used for alkylene oxide condensation reactions may also be employed. After the condensation reaction is completed, the catalyst may be removed from the reaction mixture by any known procedure, such as neutralization and filtration, or ion exchange. The condensation is preferably carried out at elevated temperatures and pressures.

The iodine-containing compositions of this invention are prepared by dissolving elemental iodine in the above-described nonionic surfactants. The amount of iodine dissolved in the surfactant will be such that provides for the preparation of a germicidal composition. In the vernacular of the germicide art, this amount is referred to as a "germicidally effective amount." Generally, from about 0.01 part to about 0.50 part, preferably from 0.15 part to 0.30 part by weight, of iodine per part of nonionic surfactant will be employed, the maximum amount being a function of the solubility of iodine in the particular surfactant selected. The exact amount of iodine which will be complexed with the nonionic surfactants will also vary with the particular use for which the complex is intended. The lower amounts are more appropriate for hand-washing operations while the higher amounts are more useful in food-handling industries.

In actual use, the iodine complexes of this invention are acidified and diluted with water. Generally, based on 100 parts by weight of diluted composition, from about 2 parts to about 50 parts, preferably from about 5 parts to about 20 parts, of iodine complex will be employed. This will result in a diluted composition comprising from 0.2 part to 3.0 parts, preferably from 1 part to 2 parts, of available iodine. Acidification is necessary since a pH of from about two to about four is desired in use dilutions (i.e., at 25 and 12.5 p.p.m. available iodine) in order for the iodine to exhibit optimum germicidal activity. Within this pH range, diatomic iodine is released from the surfactant carrier in maximum quantities.

In the preparation of the diluted compositions of this invention, it is often desirable to add from one part to ten parts based on 100 parts by weight of diluted composition of a stabilizing agent. Any biodegradable surfactant may be employed as the stabilizing agent. Preferably, the same surfactant that is used to complex the iodine will be employed as stabilizer. Alcohols, particularly ethanol and isopropanol, may also be employed as stabilizers.

A number of acids may be used to acidify the diluted iodine compositions of this invention. Although phosphoric acid is preferred, acids such as hydrochloric, sulfamic, hydroxyacetic, citric, malic, and mixtures thereof may be employed. The amount of acid employed will generally be such as will bring the pH of the diluted iodine compositions in the range of from two to four. Generally, the acid will comprise from about 0.5 part to 35 parts, by weight, based on 100 parts of diluted composition. The amount of acid employed will generally depend upon the intended use of the compositions. The compositions containing high amounts of acid may be used to clean and sterilize equipment made of stainless steel, while the compositions containing low amounts of acid may be used to sterilize and clean aluminum and galvanized iron.

The amount of water employed in the preparation of the diluted compositions of this invention may vary considerably and is not critical. Generally, however, from 15 parts to 97.5 parts of water, based on 100 parts by weight of diluted composition, may be employed.

The following examples illustrate the invention. All parts are by weight unless otherwise stated.

Examples I-VI

A number of nonionic surfactants were prepared from a mixture of aliphatic alcohols, ethylene oxide and propylene oxide in the following manner. Details as to the preparations are found in Table 1.

A clean, dry reactor was purged with nitrogen and charged with a mixture of straight chain aliphatic alcohols and potassium hydroxide. The charge was heated to about 125° C. and a first mixture of ethylene oxide and propylene oxide was added over a period of about two to four hours while maintaining the pressure below 90 p.s.i.g. Upon completion of the oxide addition, the reaction mixture was stirred for an additional hour and then heated to 150° C. While maintaining the temperature around 150° C., a second oxide mixture comprising ethylene oxide and propylene oxide was added over a period of about three to five hours, again maintaining the pressure below 90 p.s.i.g. The reaction mixture was then stirred for an additional hour before cooling to 75° C., at which temperature the potassium hydroxide catalyst was neutralized with glacial acetic acid. Volatiles were removed from the product by stripping at 10 mm. of mercury and at 125° C. for about one hour.

The products prepared are characterized in Table 1. Biodegradability was determined by the shake flask culture technique. This involves first preparing a basal medium of distilled water, yeast extract, ammonium chloride, potassium hydrogen phosphate, magnesium sulfate septahydrate, potassium chloride and ferrous sulfate and then adding a candidate surfactant (in the form of a solution) to the basal medium to give a surfactant concentration of 30 p.p.m. A microbial culture is prepared based on unchlorinated final effluent from an activated sludge sewage disposal plant. The basal medium containing the candidate surfactant is then inoculated with the microbial culture and placed in a shaking machine for aeration. To follow the course of biodegradation, aliquots are removed for analysis (potassium iodobismuthate method, J. Anal. Chem., Burger, K., 196, 251 (1963)) immediately after inoculation and at 24-hour intervals thereafter for a period of seven days. The analysis indicates the amount of surfactant remaining in parts per million. Although there is uncertainty in the art as to that which is biodegradable and that which is not sufficiently biodegradable, for the purpose of this application a surfactant which degrades 85% within seven days is considered biodegradable.

Iodine-containing compositions are prepared by dissolving elemental iodine into the nonionic surfactants prepared in the above examples. The compositions, upon acidification and dilution with water, possess excellent detergent, germicidal and sanitizing properties. They are useful in the cleaning and purification of equipment used in the processing of milk and other dairy products.

Example VII

To 80 parts of the nonionic surfactant of Example II was added 20 parts of elemental iodine. The mixture was heated for about one hour at 50° C. Several compositions are prepared by acidifying and diluting with water the iodine-surfactant mixture. The following compositions are prepared:

(A)

| Ingredients: | Parts |
|---|---|
| Surfactant-iodine complex (1.5 parts available iodine) | 8.75 |
| Phosphoric acid (75%) | 11.3 |
| Water | 79.95 |

(B)

| | |
|---|---|
| Surfactant-iodine complex (1.95 parts available iodine) | 11.5 |
| Hydrochloric acid (37%) | 15 |
| Phosphoric acid (75%) | 7 |
| Isopropyl alcohol | 7 |
| Water | 59.5 |

(C)

| | |
|---|---|
| Surfactant-iodine complex (1.87 parts available iodine) | 11 |
| Hydroxyacetic acid (70%) | 12 |
| Phosphoric acid (75%) | 4 |
| Surfactant | 4 |
| Water | 69 |

(D)

| | |
|---|---|
| Surfactant-iodine complex (1.87 parts available iodine) | 11 |
| Sulfamic acid | 11 |
| Phosphoric acid (75%) | 4 |
| Malic acid | 4 |
| Surfactant | 6 |
| Water | 64 |

All of the above compositions are tested for detergent, germicidal and sanitizing activity using the Cantor-Shelanski test method (Soap and Sanitary Chemicals, 27, pp. 133, 135, 137 (1951)) at both 25 p.p.m. available iodine and 12.5 p.p.m. available iodine The above compositions are useful in the cleaning and sanitizing of food-handling equipment.

TABLE 1

| | Alcohol | Parts | First Mixture | | Second Mixture | | Total EO[1]/RO[2] | Product[3] |
|---|---|---|---|---|---|---|---|---|
| | | | PO[2], parts | EO[1], parts | PO[2], parts | EO[1], parts | | |
| Example: | | | | | | | | |
| I | A | 10.00 | 5.4 | | 12.10 | 22.50 | 1.29:1 | Bio. (85%) Liquid, W. M |
| II | A | 5.55 | 3.88 | 1.66 | 4.99 | 11.63 | 1.5:1 | Do. |
| III | A | 5.49 | 4.12 | 1.37 | 4.12 | 12.35 | 1.67:1 | Do. |
| IV | A | 5.55 | 4.41 | 0.83 | 2.50 | 14.12 | 2.08:1 | Do. |
| V | A | 10.00 | 7.0 | 5.1 | 3.0 | 25.00 | 3:1 | Do. |
| VI | A | 11.00 | 4.0 | 3.0 | 1.0 | 31.00 | 6.8:1 | Do. |

[1] Ethylene oxide.
[2] Propylene oxide.
[3] All characterizations made at room temperature.

A = A mixture containing approximately 40% $C_{12}$ alcohol, 30% $C_{14}$ alcohol, 20% $C_{16}$ alcohol and 10% $C_{18}$ alcohol.
Bio. = Biodegradable.
W.M. = Water-miscible.

Example VIII

A liquid, biodegradable, water-miscible, nonionic surfactant was prepared following the procedure of Example I employing twenty parts of stearic acid, a first oxide mixture comprising ten parts of propylene oxide and five parts of ethylene oxide, and a second oxide mixture comprising ten parts of propylene oxide and 55 parts of ethylene oxide. To eighteen parts of this surfactant is added two parts of iodine and the mixture is heated for one hour at 50° C.

A detergent and germicidal composition is formulated by adding to ten parts of the above-prepared iodine complex 6.4 parts of phosphoric acid, four parts of surfactant and 79.6 parts of water. The above composition exhibits detergent, germicidal and sanitizing activity and is extremely useful when employed in the cleaning of hospital equipment.

Example IX

A nonionic surfactant is prepared following the procedure of Example I employing 5.5 parts of n-dodecyl amine, a first oxide mixture comprising 4.12 parts of propylene oxid eand 1.37 parts of ethylene oxide, and a second oxide mixture comprising 4.12 parts of propylene oxide and 12.35 parts of ethylene oxide (total ethylene oxide/propylene oxide ratio being 1.67:1). To fifteen parts of this surfactant is added five parts of iodine and the mixture is heated for one hour at 50° C.

A germicidal and detergent composition is formulated by adding to ten parts of the above-prepared iodine complex, fourteen parts of phosphoric acid (75%), six parts of ethyl alcohol and 70 parts of water. The composition exhibits germicidal and sanitizing activity and is extremely useful in the cleaning and sanitizing of equipment used to process milk.

Example X

A nonionic surfactant is prepared following the procedure of Example I, employing α,ω-dodecandioic monoamide, and mixtures of ethylene oxide and propylene oxide such that the surfactant product contains 80% by weight of oxyethylene and oxypropylene groups in a weight ratio of oxyethylene to oxypropylene of from 2:1.

To twenty parts of this nonionic surfactant is added two parts of iodine and the mixture is heated for one hour at 50° C. A germicidal and detergent composition is formulated by adding to eleven parts of the iodine-surfactant mixture six parts of phosphoric acid (75%), six parts of hydrochloric acid (37%), six parts of the biodegradable surfactant product of Example I, and 71 parts of water. The composition is an effective germicide particularly adapted for cleaning and sterilizing of hospital instruments.

What is claimed is:

1. A detergent, germicidal and sanitizing composition consisting essentially of a mixture of elemental iodine and a liquid, biodegradable, water-miscible, nonionic surfactant of the formula:

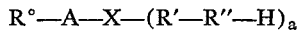

wherein R° is H or $X(R'-R''-H)_a$, A is a straight chain hydrocarbyl radical having from 8 to 22 carbon atoms or mixtures thereof, X is O, S,

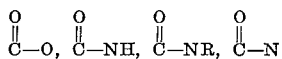

NH, NR, N, $PO_4$, $SO_3NH$, $SO_3NR$, $SO_3N$, SNH, SNR, SN, or mixtures thereof, $a$ is 1 except when X is

N, $SO_3N$, or SN when $a$ is 2, R is an alkyl group having from 1 to 4 carbon atoms, R' is selected from the group consisting of oxypropylene groups and a random mixture of oxyethylene and oxypropylene groups, the weight ratio of oxyethylene to oxypropylene in said mixture being a number less than 1, R'' is a random mixture of oxyethylene and oxypropylene groups, the weight ratio of oxyethylene to oxypropylene being such that the total weight ratio of oxyethylene to oxypropylene in R' and R'' is from 1.3:1 to 6.8:1, the total weight of the surfactant being from 67% to 80% oxyethylene and oxypropylene groups, said composition having an iodine to surfactant weight ratio of from 0.01:1 to 0.5:1.

2. The composition of claim 1 when the weight ratio of oxyethylene to oxypropylene groups is in the range of 1.3:1 to 3:1.

3. The composition of claim 1 when the nonionic surfactant is:

$$R°-A-O-R'-R''-H$$

wherein R° is H, A is a straight chain alkylene group having from 8 to 22 carbon atoms, and R' and R'' are as defined in claim 1.

4. The composition of claim 3 when the weight ratio of oxyethylene to oxypropylene groups is in the range of 1.3:1 to 3:1.

5. A detergent, germicidal and sanitizing composition consisting essentially of, based on 100 parts, from
   (a) 2 to 50 parts of a mixture of elemental iodine and a liquid, biodegradable, water-miscible, nonionic surfactant of the formula:

wherein R° is H or $X(R'-R''-H)_a$, A is a straight chain hydrocarbyl radical having from 8 to 22 carbon atoms or mixtures thereof, X is O, S,

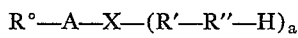

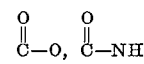

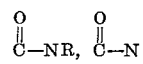

NH, NR, N, $PO_4$, $SO_3NH$, $SO_3NR$, $SO_3N$, SNH, SNR, SN, or mixtures thereof, $a$ is 1 except when X is

N, $SO_3N$, or SN when $a$ is 2, R is an alkyl group having from 1 to 4 carbon atoms, R' is selected from the group consisting of oxypropylene groups and a random mixture of oxyethylene and oxypropylene groups, the weight ratio of oxyethylene to oxypropylene in said mixture being a number less than 1, R' is a random mixture of oxyethylene and oxypropylene groups, the weight ratio of oxyethylene to oxypropylene being such that the total weight ratio of oxyethylene to oxypropylene in R' and R'' is from 1.3:1 to 6.8:1, the total weight of the surfactant being from 67% to 80% oxyethylene and oxypropylene groups,
   (b) 0.5 to 35 parts of an acid selected from the group consisting of phosphoric acid, hydrochloric acid, sulfamic acid, hydroxyacetic acid, citric acid, malic acid, and mixtures thereof, and
   (c) 15 to 97.5 parts of water, said composition having an iodine to surfactant weight ratio of from 0.01:1 to 0.5:1.

6. The composition of claim 5 when the weight ratio of oxyethylene to oxypropylene groups is in the range of 1.3:1 to 3:1.

7. The composition of claim 5 when the acid is phosphoric acid.

8. The composition of claim 5 when the acid is a mixture of phosphoric acid and hydrochloric acid.

9. The composition of claim 5 when the acid is a mixture of phosphoric acid and hydroxyacetic acid.

10. A detergent, germicidal and sanitizing composition consisting essentially of, based on 100 parts, from
    (a) 2 to 50 parts of a mixture of elemental iodine and a liquid, biodegradable, water-miscible, nonionic surfactant of the formula:

$$R°—A—O—R'—R''—H$$

wherein R° is H, A is a straight chain alkylene group having from 8 to 22 carbon atoms or mixtures thereof, and R' and R'' are as defined in claim 1.
(b) 0.5 to 35 parts of an acid selected from the group consisting of phosphoric acid, hydrochloric acid, sulfamic acid, hydroxyacetic acid, citric acid, malic acid, and mixtures thereof, and
(c) 15 to 97.5 parts of water, said composition having an iodine to surfactant weight ratio of from 0.01:1 to 0.5:1.

11. The composition of claim 10 when the weight ratio of oxyethylene to oxypropylene groups is in the range of 1.3:1 to 3:1.

12. The composition of claim 10 when the acid is phosphoric acid.

13. The composition of claim 10 when the acid is a mixture of phosphoric acid and hydrochloric acid.

14. The composition of claim 10 when the acid is a mixture of phosphoric acid and hydroxyacetic acid.

References Cited

UNITED STATES PATENTS

| | | | |
|---|---|---|---|
| 2,677,700 | 5/1954 | Jackson et al. | 252—89 |
| 2,674,619 | 4/1954 | Lunsted | 252—89 |
| 2,759,869 | 8/1956 | Sutton et al. | 252—107 |
| 2,977,315 | 3/1961 | Scheib et al. | 252—106 |
| 3,029,183 | 4/1962 | Winicov et al. | 252—106 |
| 3,220,951 | 11/1965 | Cantor et al. | 252—106 |

FOREIGN PATENTS

| | | |
|---|---|---|
| 215,922 | 7/1958 | Australia. |
| 703,091 | 1/1954 | Great Britain. |

OTHER REFERENCES

Blankenship et al. Biodegradation of Nonionics—Soap and Chemical Specialties, December 1963, pages 75–78 and 181.

LEON D. ROSDOL, *Primary Examiner.*
W. SCHULZ, *Assistant Examiner.*

U.S. Cl. X.R.

424—150; 260—615